United States Patent
Bostick et al.

(10) Patent No.: US 9,674,237 B2
(45) Date of Patent: Jun. 6, 2017

(54) FOCUS COORDINATION IN GEOGRAPHICALLY DISPERSED SYSTEMS

(71) Applicant: International Business Machines Corporation, Armonk, NY (US)

(72) Inventors: James E. Bostick, Austin, TX (US);
John M. Ganci, Jr., Cary, NC (US);
Sarbajit K. Rakshit, Kolkata (IN);
Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 14/530,817

(22) Filed: Nov. 2, 2014

(65) Prior Publication Data

US 2016/0127427 A1 May 5, 2016

(51) Int. Cl.
| | |
|---|---|
| G06F 15/16 | (2006.01) |
| H04L 29/06 | (2006.01) |
| G06F 3/01 | (2006.01) |
| G06F 17/30 | (2006.01) |
| H04L 12/58 | (2006.01) |

(52) U.S. Cl.
CPC ............ H04L 65/403 (2013.01); G06F 3/013 (2013.01); G06F 17/30864 (2013.01); H04L 51/04 (2013.01); H04L 51/043 (2013.01)

(58) Field of Classification Search
CPC ...................................................... H04L 51/043
USPC .................................................. 709/204–207
See application file for complete search history.

(56) References Cited

U.S. PATENT DOCUMENTS

| | | | |
|---|---|---|---|
| 2008/0060499 A1 | 3/2008 | Sitrick | |
| 2008/0177853 A1* | 7/2008 | Chen | H04L 12/1831 709/206 |

(Continued)

FOREIGN PATENT DOCUMENTS

| | | |
|---|---|---|
| WO | 2011083092 A1 | 7/2011 |
| WO | 2013169237 A1 | 11/2013 |

OTHER PUBLICATIONS

Hua et al; Emphatic Multiple Tutoring Agents for Multiple Learner Interface, 2010.

(Continued)

*Primary Examiner* — Hieu Hoang
(74) *Attorney, Agent, or Firm* — Garg Law Firm, PLLC; Rakesh Garg; Christopher K. McLane

(57) ABSTRACT

A method, system, and computer program product for focus coordination in geographically dispersed systems are provided in the illustrative embodiments. A shifting of focus to a first object present in a first view is detected at a first data processing system in a first location in the geographically dispersed plurality of data processing systems. Metadata of the first view is identified, the metadata being usable to identify a second object in a second view at a second data processing system in a second location in the geographically dispersed plurality of data processing systems, the second object corresponding to the object in the view. A focus information package is constructed, wherein the focus information package includes an attribute of the first object and the metadata of the first view. The focus information package is sent to the second data processing system.

14 Claims, 6 Drawing Sheets

(56) References Cited

U.S. PATENT DOCUMENTS

| | | | |
|---|---|---|---|
| 2011/0136083 A1* | 6/2011 | Morris | G09B 19/0053 |
| | | | 434/118 |
| 2013/0226845 A1* | 8/2013 | Gobert | G06N 99/005 |
| | | | 706/12 |
| 2014/0002352 A1 | 1/2014 | Jacob et al. | |
| 2015/0181294 A1* | 6/2015 | Kim | H04N 21/4622 |
| | | | 725/37 |

OTHER PUBLICATIONS

Anonymous; System and method to automatically provide optimal content based on vision and eye movement, Jun. 21, 2011.
Anonymous; Prediction of User Actions based on Brainwave and Eye-Tracking, Crowd Wisdom for Exploration . . . , Feb. 1, 2014.

* cited by examiner

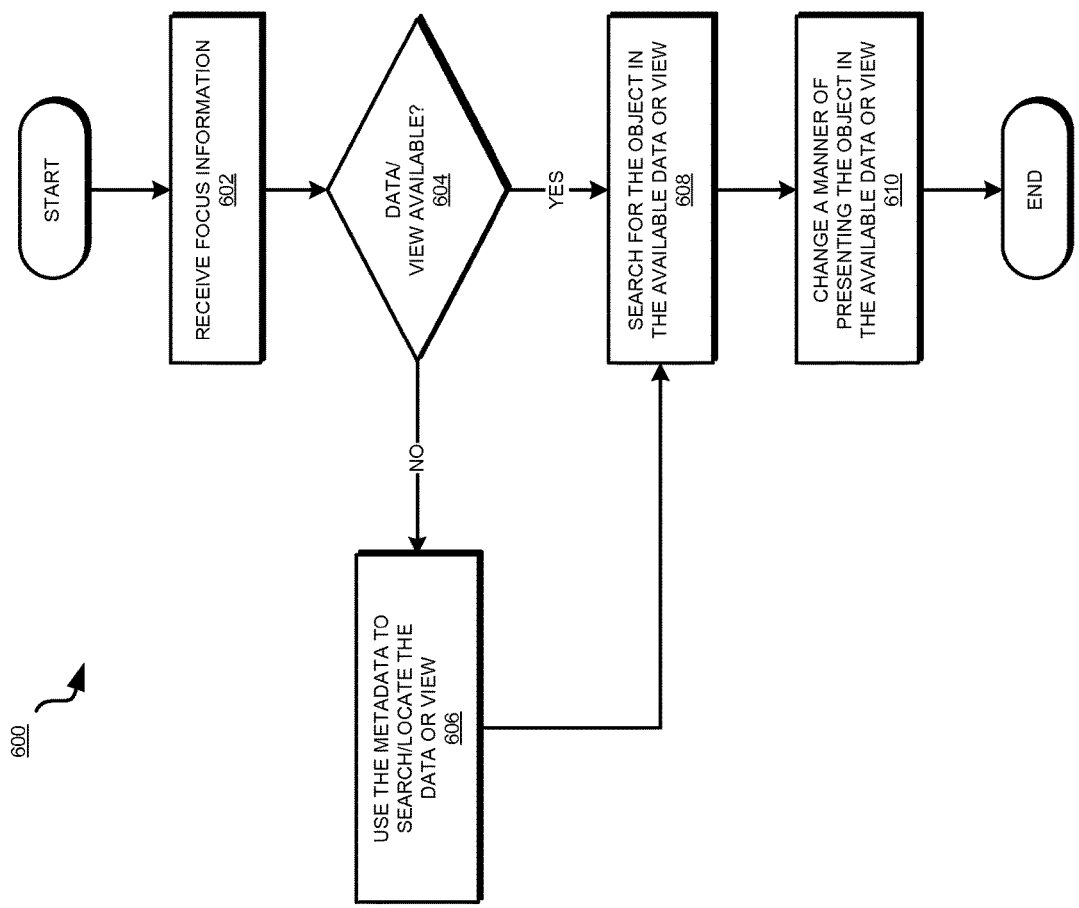

FOCUS COORDINATION IN GEOGRAPHICALLY DISPERSED SYSTEMS

TECHNICAL FIELD

The present invention relates generally to a method, system, and computer program product for collaborative computing using multiple data processing systems. More particularly, the present invention relates to a method, system, and computer program product for focus coordination in geographically dispersed systems.

BACKGROUND

Team members in a team often collaborate remotely from dispersed geographical locations. As an example, a team working on a project may have the team members in different cities, countries, or continents. From time to time, the team lead may teleconference the team members to obtain status reports on the various tasks or items related to the project.

Different team members are often assigned different tasks, and may have different views of the same project, whereas the team lead has an overarching view of the project tasks that spans the tasks of several team members. Therefore, during a teleconference, different team members can find themselves viewing different versions of the content that is being discussed. These are some example teleconferencing cases where a problem recognized by the illustrative embodiments arises.

In contrast, a web conference allows all participants to view the same content. Generally, a presenter shares the presenter's version of the content during a discussion, and other participants view the presenter's version of the content, the presenter's movements from one topic to another topic in the presenter's content. Thus, in many cases, the web conference participants are spared the frustration of following a discussion in different versions of a given content.

However, there are cases where even the web conference participants may have to rely on their own versions—different versions—of the content being discussed. These are the example web conferencing cases where a problem recognized by the illustrative embodiments arises.

A problem recognized by the illustrative embodiments can arise in other collaboration scenarios as well. As another example, a team may comprise an observer in the field, an analyst in another location, a leader in another location, and so on. The modern battlefield is one example where such a team can be found. For example, a pilot makes observations of assets on the ground, a remote analyst observes the battlefield via a satellite view, and a commander reviews a plan document, a map, a picture, a simulation, or some combination thereof.

Generally, users dispersed in different geographical locations collaborate in a similar manner for a variety of purposes. Furthermore, different collaborating users use different devices or data processing systems for participating in the collaborative effort. Often, these different devices or data processing systems present their respective users different data about the subject of the collaboration.

The different data can be different views of the same underlying data such that a data object appears differently or in different locations in the different views. For example, one collaborating user may view the data objects in a table form, whereas another collaborating user may view the same or similar data, or a part thereof, as a grid, a map, a hierarchy, or a graphical rendering. As described earlier in the battlefield example, one user's view may be a real life view of a physical space or area and things therein from one perspective, whereas another user's view may be a representation, picture, or a virtual view thereof from the same or different perspective.

The different data can also be different versions or editions of the underlying data. For example, the underlying data or core data might reside in a repository, with one online user having live connectivity to the repository for the latest data, and another offline user having access to the older data downloaded for offline use some time ago.

As another example, one user may have a higher access privilege than another user in a team. Consequently, the user with the higher access privilege may be able to see one set of data records whereas the other user may be able to see only a subset of the set of data records.

SUMMARY

The illustrative embodiments provide a method, system, and computer program product for focus coordination in geographically dispersed systems. An embodiment includes a method for focus coordination in a plurality of geographically dispersed data processing systems. The embodiment detects, at a first data processing system in a first location in the geographically dispersed plurality of data processing systems, a shifting of focus to a first object present in a first view. The embodiment identifies metadata of the first view, the metadata being usable to identify a second object in a second view at a second data processing system in a second location in the geographically dispersed plurality of data processing systems, the second object corresponding to the object in the view. The embodiment constructs a focus information package, wherein the focus information package includes an attribute of the first object and the metadata of the first view. The embodiment sends the focus information package to the second data processing system.

Another embodiment includes a computer program product for focus coordination in a plurality of geographically dispersed data processing systems. The embodiment further includes one or more computer-readable tangible storage devices. The embodiment further includes program instructions, stored on at least one of the one or more storage devices, to detect, at a first data processing system in a first location in the geographically dispersed plurality of data processing systems, a shifting of focus to a first object present in a first view. The embodiment further includes program instructions, stored on at least one of the one or more storage devices, to identify metadata of the first view, the metadata being usable to identify a second object in a second view at a second data processing system in a second location in the geographically dispersed plurality of data processing systems, the second object corresponding to the object in the view. The embodiment further includes program instructions, stored on at least one of the one or more storage devices, to construct a focus information package, wherein the focus information package includes an attribute of the first object and the metadata of the first view. The embodiment further includes program instructions, stored on at least one of the one or more storage devices, to send the focus information package to the second data processing system.

Another embodiment includes a computer system for focus coordination in a plurality of geographically dispersed data processing systems. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to detect, at a first data processing system in a first location in the geographically dispersed plurality of data processing systems, a shifting of focus to a first object present in a first view. The embodiment further includes program instructions, stored on at least one of the one or more storage devices for execution by at least one of the one or more processors via at least one of the one or more memories, to identify metadata of the first view, the metadata being usable to identify a second object in a second view at a second data processing system in a second location in the geographically dispersed plurality of data processing systems, the second object corresponding to the object in the view. The embodiment further includes program instructions, stored on at least one of the one or more storage devices for execution by at least one of the one or more processors via at least one of the one or more memories, to construct a focus information package, wherein the focus information package includes an attribute of the first object and the metadata of the first view. The embodiment further includes program instructions, stored on at least one of the one or more storage devices for execution by at least one of the one or more processors via at least one of the one or more memories, to send the focus information package to the second data processing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of another example process for focus coordination in a collaborative environment in accordance with an illustrative embodiment.

DETAILED DESCRIPTION

Figure 1:
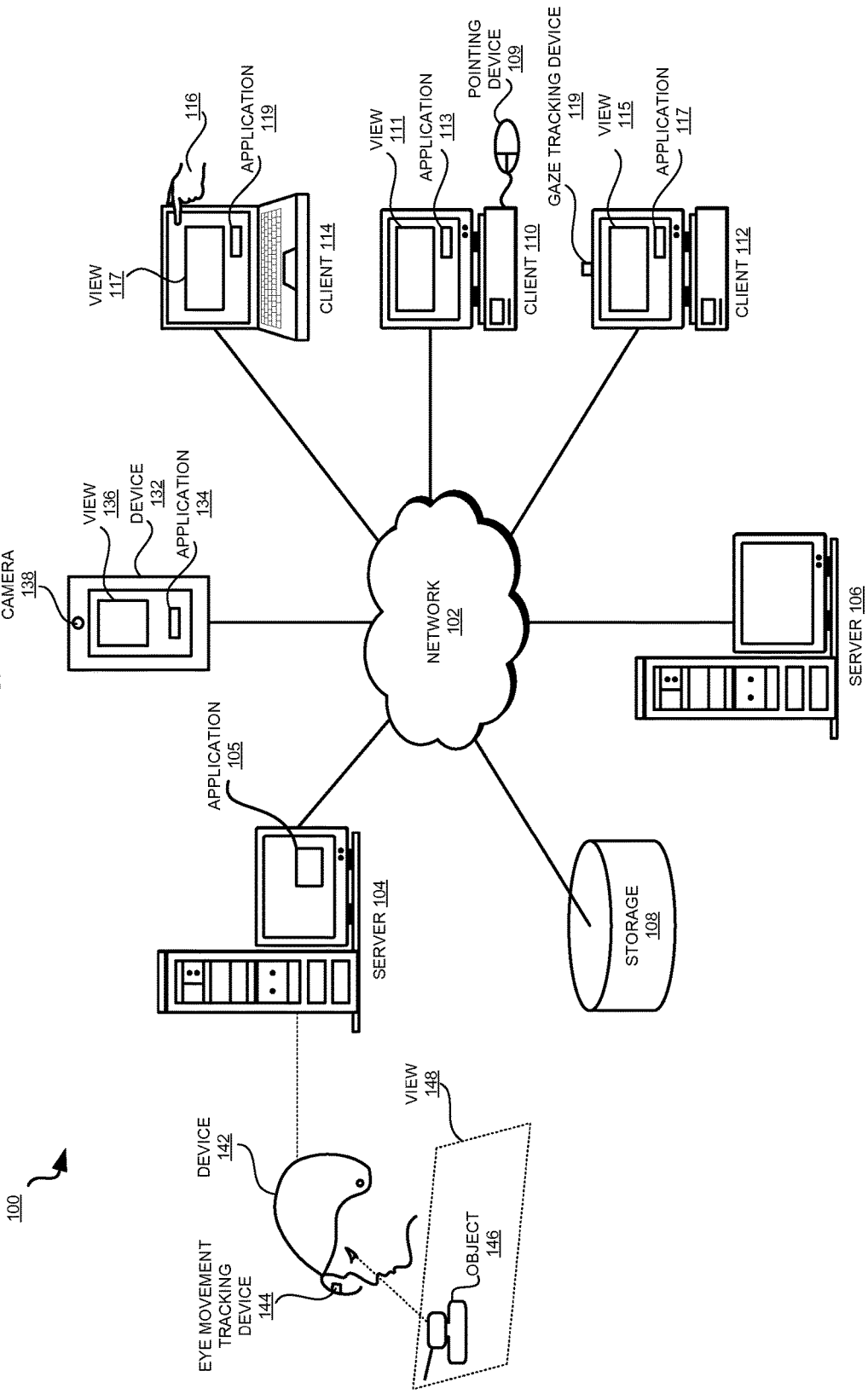
FIG. 1 depicts a block diagram of a network of data processing systems in which illustrative embodiments may be implemented.

Within the scope of the illustrative embodiments, "focus" comprises any manifestation of giving attention to an object. The object can be a data object, a physical object, of any type or structure.

Some examples of giving attention to an object include, but are not limited to, looking or gazing at the object, pointing to the object, or calling out an aspect of the object. For example, a user may direct the user's eyes to a data record (object) in the data presented on the user's screen. As another example, a user may direct the user's eyes or an imaging device to a physical object (object) in a physical area. As another example, a user may move a pointing device, such as a mouse or a stylus, or make a touch-gesture to select or identify a data artifact (object) in a data view.

Generally, within the scope of the illustrative embodiments, a view can be a logical view of data or a sight view of a physical space or area and objects therein. Examples of the logical view of the data include but are not limited to one or more visual presentations of same data, visual presentations of different data, graphical representation of physical things, or a combination thereof.

The illustrative embodiments recognize that collaboration can be difficult when different users in different locations are using different data processing systems or devices that present different views of the data of the collaborative effort. For example, when a team lead switches focus from one project task assigned to one user, to another project task assigned to another user, the team members on the conference call have to scramble to find the new object of focus during the discussion in their respective views of the data.

The illustrative embodiments recognize that repeated struggles to follow the changing focus in the collaborative effort are unproductive, confusing, and likely to cause errors in the collaborative effort. For example, if the team lead switches from an object of topic A to an object of topic B, the objects of topics A and B may be adjacent to one another in the team lead's view but one team member may have to scroll through the data to find topic B object buried several pages down. Yet another team member may not find the object of topic B at all because in that team member's view, topic B may be a subtopic of topic X, the object of which is either collapsed, or not even presented on the device at the time. Another team member may have to struggle to locate a different representation of the topic B object because the view of the project data presented on that team member's device is different from the view on the team lead's device.

As another example, a live view of a target object on the ground from a pilot's perspective may be clear but a rendering of that target object may be obscured in another view available to a remote analyst due to the different perspective, different scale of things in the analyst's view, differences in the colors or contrast between a live view and a virtual view, and so on. The illustrative embodiments recognize that the time and effort needed to find and change the object of focus during a live collaborative effort of any type is at least annoying or distracting, and is often much more unproductive or counter-productive.

The illustrative embodiments used to describe the invention generally address and solve the above-described problems and other problems related to finding and changing the objects of focus during collaborative efforts. The illustrative embodiments provide a method, system, and computer program product for focus coordination in geographically dispersed systems.

For the clarity of the description, and without implying any limitation thereto, the user whose focus is detected is called a primary user. Accordingly, the primary user's view in which the focus is detected is called a primary view, and the primary user's data processing system or device on which the primary view is presented is called the primary data processing system or the primary device.

For the clarity of the description, and without implying any limitation thereto, a collaborating user whose is trying to follow the primary user's focus using a different view on a different data processing system or device is called a secondary user. Accordingly, the secondary user's view in which the focus is to be found or changed is called a secondary view, and the secondary user's data processing system or device on which the secondary view is presented is called the secondary data processing system or the primary device.

Coordination of focus according to the illustrative embodiments is the process of determining an object of focus of the primary user from a primary view on a primary data processing system or device, and finding the same or similar object of focus on any number or type of secondary views on any number or type of geographically dispersed secondary data processing system or device.

An embodiment is implemented as an application in a data processing system or device used to present one or more objects to a primary user. The embodiment detects a focus of the primary user's attention.

For example, the embodiment detects a focal point of the primary user's gaze by tracking the primary user's eye movement on a primary view in the primary data processing system or device. Any known device or technique for gaze tracking or eye motion tracking can be employed with the embodiment for this purpose. As another example, the embodiment can alternatively detect the focus by analyzing the movement data of a pointing device, a touch gesture, or keystrokes used by the primary user on the primary view. Using the information about the point of the primary user's focus and the primary view on which the focus is directed, the embodiment identifies one or more objects that are the target of the focus (object or objects of focus).

Another embodiment optionally further determines information about the primary view (metadata). For example, if the primary view presents all or a portion of a data file, the metadata identifies the file, the portion, the location of the file, the location of the portion in the file, alternate paths to the source of the file, copies of the file available from other sources, alternate names of the file, names of files with similar contents, access permissions associated with the file, dates or persons associated with the file, and any of the other numerous similarly purposed parameters associated with the file. The metadata is usable to identify or locate the file or the portion therein from one or more data processing systems or devices in one or more geographical locations.

Another embodiment prepares a package of focus information. The focus information includes information sufficient to search for the object of focus in another view at another data processing system or device used by another user. The focus information comprises one or more identifiers of the object of focus from the view in which the focus was detected, the metadata of the view in which the focus was detected, and any other information usable for locating the same or similar object in the other view at the other data processing system or device used by the other user. The embodiment then transmits the packaged focus information to one or more secondary data processing systems or devices.

For example, in one embodiment, identifying information about a secondary data processing system or device, a secondary view on such secondary data processing system or device, a secondary user, or a combination thereof (collectively secondary identifying information) is available to an embodiment at the primary data processing system or device. When the primary and secondary users collaborate, such identifying information can be exchanged at any suitable time, using any suitable methods, during or prior to the collaboration.

Using the identifying information, the embodiment constructs the focus information package such that the identified secondary data processing system or device can locate the file or data for the secondary view, and locate the object of focus in the located file or data for the secondary user. Furthermore, in one embodiment, when the secondary indentifying information is available, the focus information package also describes a manner of searching for the object of focus in the secondary view.

For example, if the secondary indentifying information reveals that the secondary view is a database table view, the focus information package includes a query or the like to search the database table view. An example of such a query could include an exact identifier, a wildcard identifier, or a regular expression identifier of the object of focus.

As another example, if the secondary indentifying information reveals that the secondary view is a map view, the focus information package includes a query or the like to match the graphical artifacts of the map view using certain characteristics of the object of the focus. An example of such a characteristic could include a shape description, a label, a commonly used name of the depicted thing, or an identifier of the object of focus.

As another example, if the secondary indentifying information reveals that the secondary view is a spreadsheet-like grid view, the focus information package includes a query or the like to match the cell parameters of the grid view using one or more parameters of the object of the focus. An example of such a query could include a content fragment, a value, a formula, or an identifier of the object of focus.

These example methods of searching for an object of focus in a secondary view are not intended to be limiting on the illustrative embodiments. From this disclosure, those of ordinary skill in the art will be able to identify many other ways of searching for other types of objects in other types of views, and ways of packaging information for invoking such searches at the secondary data processing system or devices. Such searches and information are contemplated for packaging in the focus information package within the scope of the illustrative embodiments.

Another embodiment executes as an application in a secondary data processing system or device. The embodiment receives the focus information package. Under some circumstances, the secondary data processing system or device might already be presenting a view to the secondary user, and that already presented view is usable by the embodiment as the secondary view in which to find the object of focus.

In some other circumstances, the secondary data processing system or device may not be presenting a view that is usable for finding the object of focus. For example the user may be collaborating on one project, but may have a spreadsheet of a different project displayed on the screen at the time the focus information is received. Under such circumstances, the embodiment uses the metadata from the focus information package to construct a secondary view suitable for searching for the object of focus, such as by identifying the correct file to open on the secondary data processing system or device.

If no suitable secondary view can be found, such as when a file identified in the metadata cannot be loaded at the secondary data processing system or device, an embodiment presents an error to the secondary user and allows the user to proceed as secondary users presently do during collaborations. Otherwise, once the appropriate secondary view is available on the secondary data processing system or device, the embodiment performs a search for the object of focus.

In one embodiment, the search for the object of focus at the secondary data processing system or device is usable at a plurality of secondary data processing systems or devices. In another embodiment, the search for the object of focus is specific to a particular secondary data processing system or device, a particular secondary view, a particular secondary user, or a combination thereof.

If the object of focus or an object similar thereto is not found in the secondary view, an embodiment presents an error to the secondary user and allows the user to proceed as secondary users presently do during collaborations. Otherwise, when the search for the object of focus identifies the object of focus or an equivalent object in the secondary view, the embodiment adjusts a manner of presenting such object in the secondary view.

As some examples of presenting the found object in the secondary view, the object can be highlighted, color-changed, flashed, brought forth, scrolled to, pointed towards, or otherwise visually or audibly brought to the secondary user's attention. From this disclosure, those of ordinary skill in the art will be able to conceive many other ways of bringing the found object into focus at the secondary data processing system or device, and the same are contemplated within the scope of the illustrative embodiments.

A method of an embodiment described herein, when implemented to execute on a data processing system, comprises substantial advancement of the functionality of that data processing system in providing collaboration functionality. For example, the illustrative embodiments enable the data processing system, e.g., a secondary data processing system or device, to automatically search for an object of focus of a geographically dispersed primary user at a primary data processing system or device. The illustrative embodiments further enable the secondary data processing system or device to automatically present the found object of focus or an equivalent thereof, in such a manner that the focus of the secondary user is changed to the found object. Such manner of automatically communicating focus changes across different data processing systems and devices to correspondingly change a one user's focus based on another user's changing focus is unavailable in presently available data processing systems for providing collaboration functionality. Thus, a substantial advancement of such data processing systems by executing a method of an embodiment comprises focus coordination in geographically dispersed systems while reducing the delays or errors in the collaboration, thereby improving the speed and accuracy of collaborative efforts using such improved data processing systems or devices.

The illustrative embodiments are described with respect to certain physical and virtual manifestation of things, objects, views, data, searches, parameters, characteristics, techniques, devices, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment of the invention, either locally at the mobile device or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
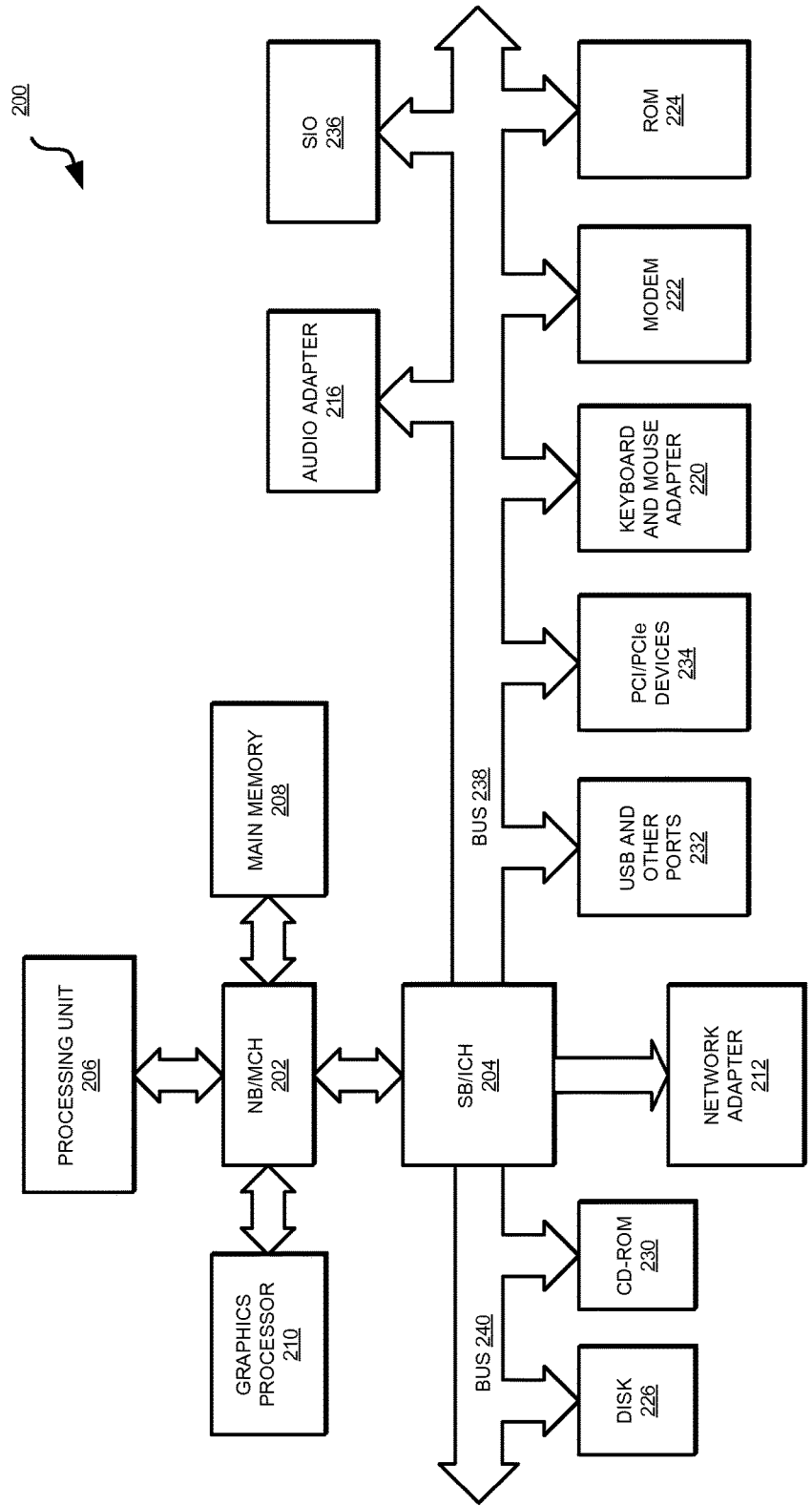
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a primary or secondary device described herein. For example, device 132 can take the form of a smartphone, a tablet computer, a laptop computer, client 110, a wearable computing device, or any other suitable device that can be configured for collaborative interactions with other data processing systems or devices. Application 134 implements an embodiment described herein. View 136 can be a primary or a secondary view as described herein. Camera 138 is usable for tracking the change of a user's focus as described herein. Similarly, client 110 comprises example pointing device 109, which is usable for tracking the change of a user's focus as described herein. View 111 can be a primary or a secondary view as described herein, and application 113 implements an embodiment described herein. Similarly, client 114 comprises a touch-sensitive interface to use touch-based gestures 116, which are usable for tracking the change of a user's focus as described herein. View 117 can be a primary or a secondary view as described herein, and application 119 implements an embodiment described herein. Similarly, client 112 comprises example gaze tracking device 119, which is usable for tracking the change of a user's focus as described herein. View 115 can be a primary or a secondary view as described herein, and application 117 implements an embodiment described herein. Device 142 comprises eye movement tracking device 144, which is usable for tracking the change of a user's focus as described herein, for example when the user's eyes shift to focus on physical object 146 within view 148 of a physical space or area, such as a tank in a battlefield. Device 142 can be any suitable apparatus that enables eye movement tracking device 144 to communicate with application 105 in server 104.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or 142 in FIG. 1 in which computer usable program code or instructions implementing the processes of the illustrative embodiments may be located. Data processing system 200 is described as a computer only as an example, without being limited thereto. Implementations in the form of other devices, such as device 132 or 142 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, application 113, application 117, application 119, or application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
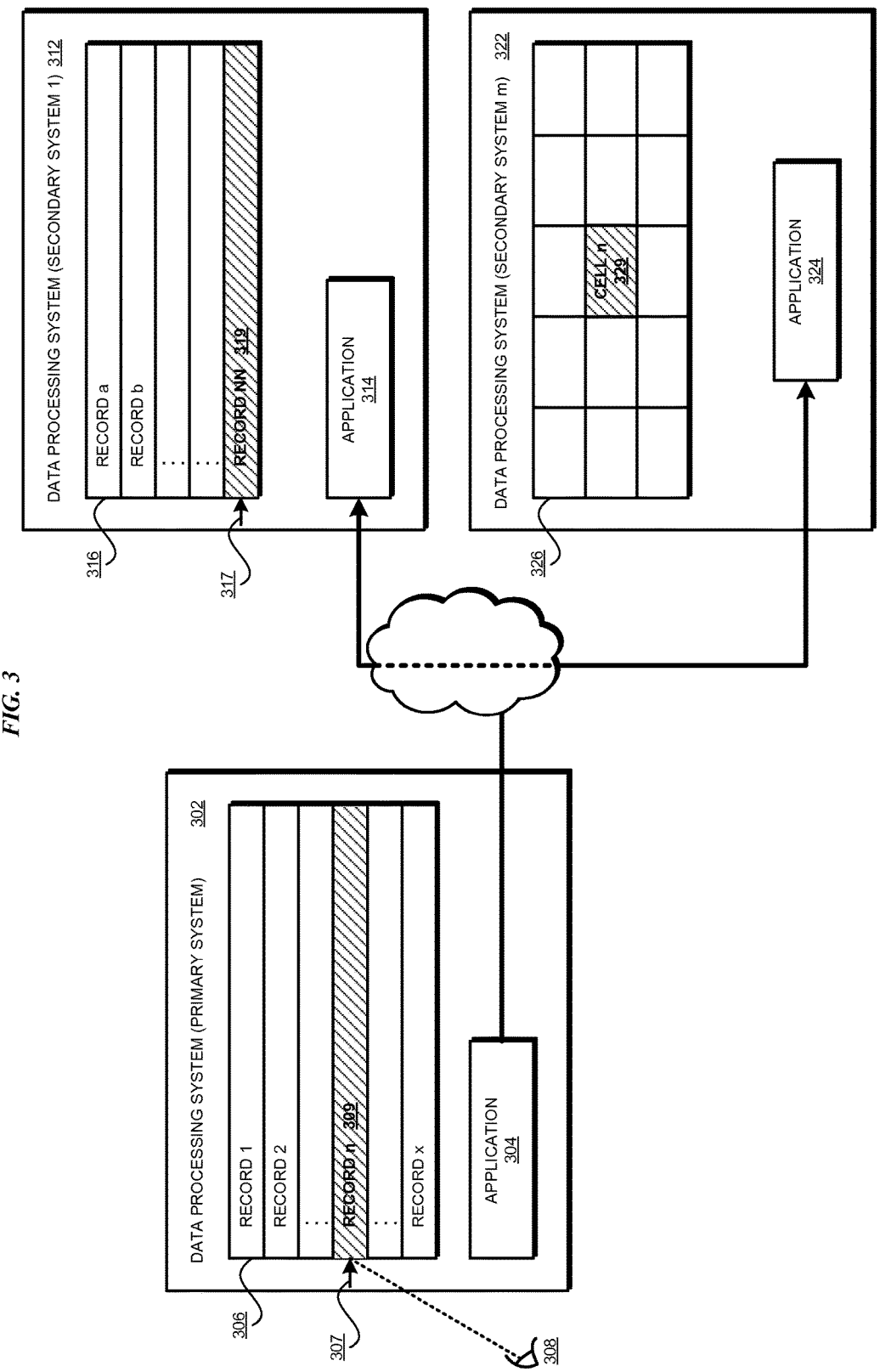
FIG. 3 depicts an example configuration for focus coordination in geographically dispersed systems in accordance with an illustrative embodiment.

With reference to FIG. 3, this figure depicts an example configuration for focus coordination in geographically dispersed systems in accordance with an illustrative embodiment. Data processing system 302, labeled "primary system", is an example primary data processing system or device, such as client 112 or server 104 in FIG. 1, and accordingly application 304 is an example of application 117 or 105 in FIG. 1, respectively. Similarly, view 306 is an example of view 115 or view 148 in FIG. 1, respectively.

Data processing system 312, labeled "secondary system 1", is an example secondary data processing system or device, such as client 110 or 114, or device 132 in FIG. 1, and accordingly application 314 is an example of application 113 or 119, or application 134, respectively, in FIG. 1. View 316 is an example of view 111 in FIG. 1. Data processing system 322, labeled "secondary system m", is an example secondary data processing system or device, such as device 132 in FIG. 1, and accordingly application 324 is an example of application 134 in FIG. 1. View 326 is an example of view 136 in FIG. 1.

Primary user 308 changes focus to object 309 labeled as "record n" in view 306. Primary user 308's focus can be detected using the eye movements of primary user 308 or alternatively by detecting pointer 307 being positioned at object 309.

Application 306 detects that the object of focus is object 309. Application 304 constructs a focus information package as described elsewhere in this disclosure, and transmits the focus information package to systems 312 and 322.

Application 314 executing in system 312 receives the focus information package. Application 314 either identifies view 316 as the secondary view having the correct data within which to find the object of focus, or finds and loads the correct data into view 316 within which to find the object of focus.

Using one or more parameters, attributes, or characteristics of the object of focus from the focus information package, application 314 identifies object 319, labeled "record NN" in view 316 as the object of focus of primary user 308. Notice that relative to view 306, "record NN" (object 319) appears different from "record n" (object 309), appears in a different location from "record n", or both, in view 316.

Application 314 draws the secondary user's attention to object 319 in any suitable way. For example, application 314 may change the appearance of object 319, or alternatively, position pointer 317 at object 319.

Application 324 executing in system 322 receives the focus information package. Application 324 either identifies view 326 as the secondary view having the correct data within which to find the object of focus, or finds and loads the correct data into view 326 within which to find the object of focus.

Using one or more parameters, attributes, or characteristics of the object of focus from the focus information package, application 324 identifies object 329, labeled "cell n" in view 326 as the object of focus of primary user 308. Notice that relative to view 306, "cell n" (object 329) appears different from "record n" (object 309), appears in a different from as compared to "record n", or both, in view 326.

Application 324 draws the secondary user's attention to object 329 in any suitable way. For example, application 324 may change the appearance of object 329.

In the above-described embodiment with respect to FIG. 3, applications 314 and 324 use the same focus information package to identify different objects 319 and 329, respectively, in their respective views 316 and 326. Another embodiment with respect to FIG. 3 causes application 304 to construct different focus information packets for applications 314 and 324. Accordingly, application 314 uses one focus information package to identify object 319 to the secondary user of system 312, and application 324 uses a different focus information package to identify object 329 to the secondary user of system 322, even though objects 319 and 329 both correspond to object 309.

To enable such an embodiment, application 306 receives secondary identifying information from secondary system 312 and secondary system 322, prior to constructing the focus information packages. As described elsewhere in this disclosure, application 304 uses the secondary identifying information of each specific secondary system to construct a secondary system-specific focus information package such that suitable data can be located, loaded, and searched at that secondary system.

Figure 4:
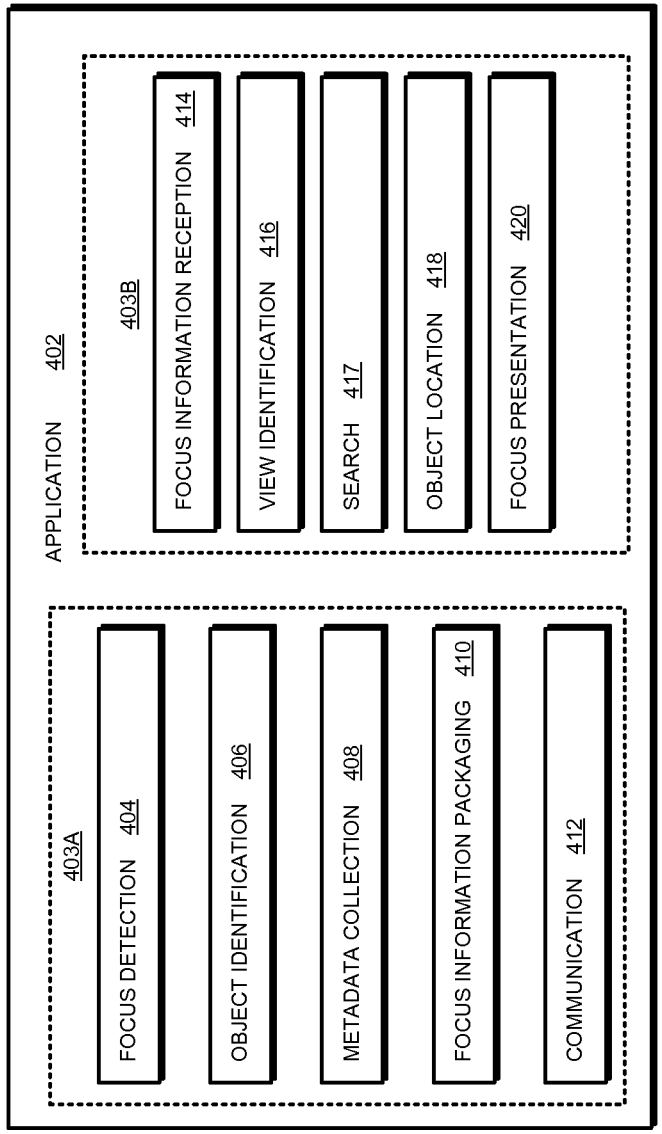
FIG. 4 depicts a block diagram of an example application for focus coordination in geographically dispersed systems in accordance with an illustrative embodiment.

With reference to FIG. 4, this figure depicts a block diagram of an example application for focus coordination in geographically dispersed systems in accordance with an illustrative embodiment. Application 402 can be implemented as application 304, 314, or 324 in FIG. 3. Such as implementation allows a data processing system or device to switch roles from primary to secondary, and vice-versa, during collaborations.

In some implementations, some data processing systems or devices may always act as primary, and some data processing systems or devices may always act as secondary. In such cases, application 402 can be broken up into application 403A and application 403B. Application 403A can be implemented as application 304 in FIG. 3, and application 403B can be implemented as applications 314 and 324 in FIG. 3.

Component 404 detects that the primary user has focused on an object. Component 404 is configured to use any of the number of example ways described herein, and other similarly purposed ways, for this purpose.

Component 406 identifies the object of focus upon focus detection. Component 408 collects the metadata from the primary view where the object of focus is located. The metadata is useful in locating, loading, and searching the correct data for corresponding objects at one or more secondary data processing systems or devices as described elsewhere in this disclosure.

Component 410 constructs one or more focus information packages for the one or more secondary data processing systems or devices. A focus information package may be generic, in that more than one secondary data processing systems or devices can use the same focus information package to locate the object of focus or an equivalent thereof at those secondary data processing systems or devices. A focus information package may be specific, in that a specific secondary data processing system or device can use the focus information package to locate the object of focus or an equivalent thereof at that specific secondary data processing system or device, and different secondary data processing systems or devices use different focus information packages in a similar manner.

Component 412 transmits the one or more focus information packages to one or more secondary data processing systems or devices.

Component 414, executing in a different instance of application 402 at a secondary data processing system or device receives a focus information package. Component 416 identifies a secondary view in which the object of focus is to be searched. Optionally, component 417 uses the metadata in the focus information package to locate and load suitable data to form the secondary view, which component 416 identifies as the secondary view to use.

Component 418 searches, e.g., using the search capabilities of component 417, the identified or loaded secondary view for the object of focus. For example, if the view includes database content, component 417 performs a database records search, e.g., using SQL. As another example, if the view includes textual content, component 417 performs a textual search. As another example, if the view includes graphical content, component 417 performs a graphical search. Generally, the search method used by component 417 is variable according to the type of content identified and loaded into the secondary view. In one embodiment, the metadata can specify the type of search, or the search method that component 417 should use.

Focus presentation component 420 alters an aspect of the object found from the search such that the secondary user's focus is attracted or directed to the found object. For example, in one embodiment, component 420 highlights the object on the user's screen. In another example embodiment, component 420 flashes the object on the user's screen. In another example embodiment, component 420 provides a haptic, visual, or audible feedback to the user when the user hovers over, passes over, or otherwise interacts with the object. Any suitable form of altering an aspect of the object, or providing a feedback relative to the object is usable within the scope of the illustrative embodiments.

Figure 5:
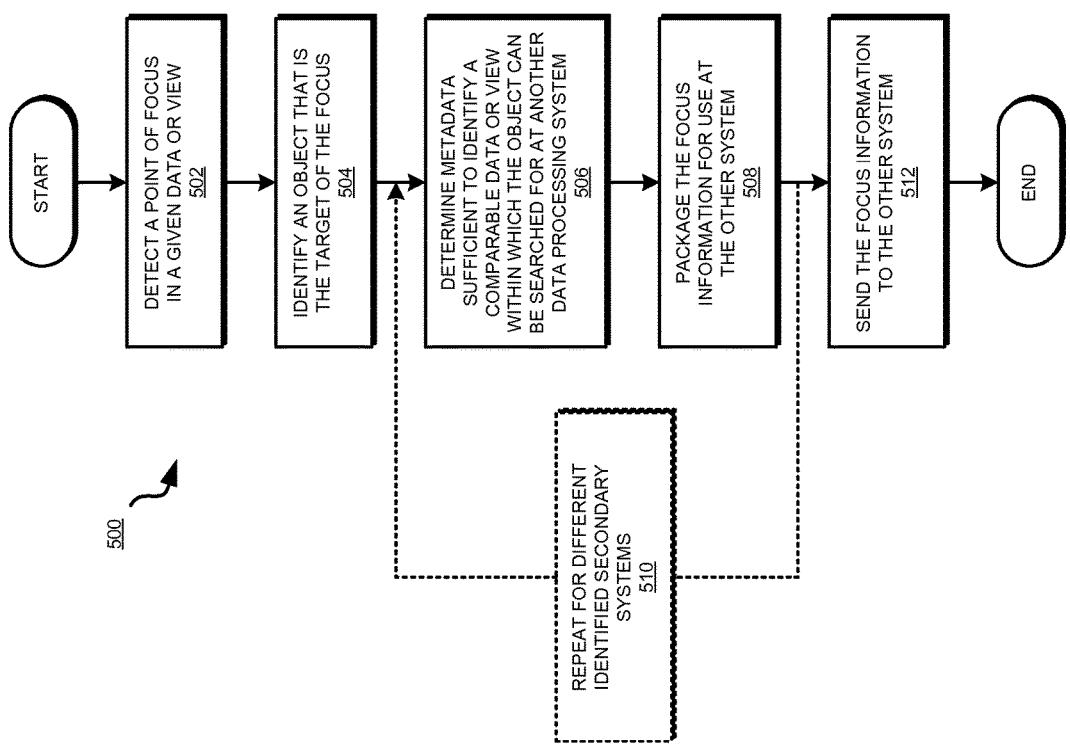
FIG. 5 depicts a flowchart of an example process for focus coordination in a collaborative environment in accordance with an illustrative embodiment.

With reference to FIG. 5, this figure depicts a flowchart of an example process for focus coordination in a collaborative environment in accordance with an illustrative embodiment. Process 500 can be implemented in application 304 in FIG. 3, such as by using portion 403A of application 402 in FIG. 4.

The application detects a point that is attracting a primary user's focus in a given content or view at a primary data processing system or device (block 502). The application identifies an object that is the target of that focus in that view (block 504).

The application determines metadata sufficient to identify a comparable view, within which the object or an equivalent thereof can be searched for at another data processing system, e.g., at a secondary data processing systems or device (block 506). The application packages the object information and the metadata into a focus information package for use at the other data processing system (block 508). When distinct focus information package is warranted by specific secondary data processing systems or devices, the application repeats blocks 506 and 508 for each such specific secondary data processing system or device (block 510).

The application sends a focus information package constructed in this manner to one or more secondary data processing system or device (block 512). The application ends process 500 thereafter.

With reference to FIG. 6, this figure depicts a flowchart of another example process for focus coordination in a collaborative environment in accordance with an illustrative embodiment. Process 600 can be implemented in application 314 or 324 in FIG. 3, such as by using portion 403B of application 402 in FIG. 4.

The application receives a focus information package (block 602). The application determines whether the data or view where the object of focus is to be searched is presently available on the secondary data processing system or device where the application is executing (block 604). If such data or view is not presently available ("No" path of block 604), the application uses the metadata in the focus information package to locate and load the data or view on the secondary data processing system or device (block 606). The application proceeds to block 608 thereafter.

If such data or view is presently available ("Yes" path of block 604), or has been located and loaded at block 606, the application searches for the object of focus in the now available view (block 608). The application changes a manner of presenting the object resulting from the search such that a secondary user's attention is drawn to the object without the user having to manually look or scan for the object in the view during the collaboration (block 610). The application ends process 600 thereafter.

Thus, a computer implemented method, system or apparatus, and computer program product are provided in the illustrative embodiments for focus coordination in geographically dispersed systems. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for focus coordination in a plurality of geographically dispersed data processing systems, the method comprising:
   detecting, using a processor and a memory at a first data processing system in a first location in the geographically dispersed plurality of data processing systems, a shifting of focus to a first object present in a first view;
   identifying, using the processor and the memory, metadata of the first view, the metadata being usable to identify a second object in a second view at a second data processing system in a second location in the geographically dispersed plurality of data processing systems, the second object corresponding to the first object in the first view;
   constructing, using the processor and the memory, a focus information package, wherein the focus information package includes an attribute of the first object and the metadata of the first view;
   sending, using the processor and the memory, the focus information package to the second data processing system, the sending causing a second processor at the second data processing system to perform:
      receiving the focus information package;
      determining whether the second view is available at the second data processing system;
      searching, responsive to the second view being available at the second data processing system, for the second object using the attribute of the first object in the second view;
      adjusting an attribute of the second object in the second view such that a focus of a second user at the second data processing system is drawn to the second object;
      locating, responsive to determining that the second view is not available at the second data processing system, data usable in the second view for the searching; and
      loading the data to make the second view available on the second data processing system.

2. The method of claim 1, further comprising:
   constructing a second focus information package, wherein the focus information package includes an attribute of the first object and the metadata of the first view, wherein the metadata is usable to identify a third object in a third view at a third data processing system in a third location in the geographically dispersed plurality of data processing systems, the third object corresponding to the object in the view; and
   sending the second focus information package to the third data processing system.

3. The method of claim 1, further comprising:
   receiving, at the first data processing system, identifying information about at least one of (i) a second user of the second data processing system, (ii) the second data processing system, and (iii) the second view, wherein the metadata is identified responsive to receiving the identifying information.

4. The method of claim 1, further comprising:
   tracking an eye movement of a user of the first data processing system to the first object in the first view.

5. The method of claim 1, wherein the first object is a data object, and the first view comprises a logical view of first data on the first data processing system.

6. The method of claim 1, wherein the first object is a physical object, and the first view comprises an actual sight of a physical area.

7. The method of claim 1, wherein the second object is a different form of the first object.

8. The method of claim 1, wherein a presentation of the second object in the second view at the second data processing system is different from a presentation of the first object in the first view at the first data processing system.

9. The method of claim 1, where the focus information package further comprises a description of a search method, wherein the search method is usable to find the second object in the second view at the second data processing system.

10. A computer program product for focus coordination in a plurality of geographically dispersed data processing systems, the computer program product comprising:
   one or more computer-readable tangible storage devices;
   program instructions, stored on at least one of the one or more storage devices, to detect, using a processor and a memory at a first data processing system in a first location in the geographically dispersed plurality of data processing systems, a shifting of focus to a first object present in a first view;
   program instructions, stored on at least one of the one or more storage devices, to identify, using the processor and the memory, metadata of the first view, the metadata being usable to identify a second object in a second view at a second data processing system in a second location in the geographically dispersed plurality of data processing systems, the second object corresponding to the first object in the first view;
   program instructions, stored on at least one of the one or more storage devices, to construct, using the processor and the memory, a focus information package, wherein the focus information package includes an attribute of the first object and the metadata of the first view; and
   program instructions, stored on at least one of the one or more storage devices, to send, using the processor and the memory, of the focus information package to the second data processing system, the program instructions to send causing a second processor at the second data processing system to perform:
      receiving the focus information package;
      determining whether the second view is available at the second data processing system;
      searching, responsive to the second view being available at the second data processing system, for the second object using the attribute of the first object in the second view;
      adjusting an attribute of the second object in the second view such that a focus of a second user at the second data processing system is drawn to the second object;
      locating, responsive to determining that the second view is not available at the second data processing system, data usable in the second view for the searching; and
      loading the data to make the second view available on the second data processing system.

11. The computer program product of claim 10, further comprising:
program instructions, stored on at least one of the one or more storage devices, to construct a second focus information package, wherein the focus information package includes an attribute of the first object and the metadata of the first view, wherein the metadata is usable to identify a third object in a third view at a third data processing system in a third location in the geographically dispersed plurality of data processing systems, the third object corresponding to the object in the view; and
program instructions, stored on at least one of the one or more storage devices, to send the second focus information package to the third data processing system.

12. The computer program product of claim 10, further comprising:
program instructions, stored on at least one of the one or more storage devices, to receive, at the first data processing system, identifying information about at least one of (i) a second user of the second data processing system, (ii) the second data processing system, and (iii) the second view, wherein the metadata is identified responsive to receiving the identifying information.

13. The computer program product of claim 10, further comprising:
program instructions, stored on at least one of the one or more storage devices, to track an eye movement of a user of the first data processing system to the first object in the first view.

14. A computer system for focus coordination in a plurality of geographically dispersed data processing systems, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to detect, at a first data processing system in a first location in the geographically dispersed plurality of data processing systems, a shifting of focus to a first object present in a first view;
program instructions, stored on at least one of the one or more storage devices for execution by at least one of the one or more processors via at least one of the one or more memories, to identify metadata of the first view, the metadata being usable to identify a second object in a second view at a second data processing system in a second location in the geographically dispersed plurality of data processing systems, the second object corresponding to the first object in the first view;
program instructions, stored on at least one of the one or more storage devices for execution by at least one of the one or more processors via at least one of the one or more memories, to construct a focus information package, wherein the focus information package includes an attribute of the first object and the metadata of the first view; and
program instructions, stored on at least one of the one or more storage devices for execution by at least one of the one or more processors via at least one of the one or more memories, to send the focus information package to the second data processing system, the program instructions to send causing a second processor at the second data processing system to perform:
receiving the focus information package;
determining whether the second view is available at the second data processing system;
searching, responsive to the second view being available at the second data processing system, for the second object using the attribute of the first object in the second view;
adjusting an attribute of the second object in the second view such that a focus of a second user at the second data processing system is drawn to the second object;
locating, responsive to determining that the second view is not available at the second data processing system, data usable in the second view for the searching; and
loading the data to make the second view available on the second data processing system.

* * * * *